(12) United States Patent
Knight et al.

(10) Patent No.: US 10,827,865 B2
(45) Date of Patent: Nov. 10, 2020

(54) MODULAR FLOOR MAT

(71) Applicant: Milliken & Company, Spartanburg, SC (US)

(72) Inventors: Jonathon Knight, Stockport (GB); Jonathon Pickersgill, Bury (GB); Michael Woolley, Rochdale (GB)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 16/153,934

(22) Filed: Oct. 8, 2018

(65) Prior Publication Data

US 2019/0117040 A1    Apr. 25, 2019

Related U.S. Application Data

(60) Provisional application No. 62/576,128, filed on Oct. 24, 2017.

(51) Int. Cl.
*A47G 27/02* (2006.01)

(52) U.S. Cl.
CPC ....... *A47G 27/0293* (2013.01); *A47G 27/025* (2013.01); *A47G 27/0218* (2013.01); *A47G 27/0275* (2013.01); *B32B 2471/04* (2013.01)

(58) Field of Classification Search
CPC ............ A47G 27/0231; A47G 27/0218; A47G 27/0212; A47G 27/02; A47G 27/0293; A47G 27/0275; A47G 27/025; A47L 23/26; A47L 23/266; B32B 2471/04
See application file for complete search history.

(56) References Cited

U.S. PATENT DOCUMENTS

| | | | |
|---|---|---|---|
| 5,167,087 A | 12/1992 | Plumly | 40/600 |
| 6,911,245 B2* | 6/2005 | Beistline | A47G 27/0275 428/85 |
| 7,678,159 B1 | 3/2010 | Weiner | 8/478 |
| 7,846,214 B1 | 12/2010 | Weiner | 8/478 |
| 9,700,165 B2* | 7/2017 | Johnson | A47G 27/0231 |
| 2007/0059480 A1* | 3/2007 | Potok | B44C 1/105 428/67 |
| 2011/0229692 A1* | 9/2011 | Bozouklian | A47L 23/266 428/156 |
| 2011/0318523 A1* | 12/2011 | Todd | A47G 27/0225 428/67 |
| 2013/0122243 A1 | 5/2013 | Griffin | 428/116 |
| 2016/0037949 A1* | 2/2016 | Dawson | A47G 27/0206 428/95 |

(Continued)

OTHER PUBLICATIONS

Patent Cooperation Treaty PCT International Search Report. dated Dec. 19, 2018. International Application No. PCT/US2018/054926. International Filing Date: Oct. 9, 2018.

(Continued)

*Primary Examiner* — Andrew J Triggs
(74) *Attorney, Agent, or Firm* — Brenda D. Wentz

(57) ABSTRACT

This invention relates to a modular floor mat comprising a plurality of interconnected thermoplastic trays with textile substrate inserts. The textile substrate inserts contain visual images, such as printed logos or advertisements. The modular floor mat is advantageous for use by businesses in entryways and other locations where advertising or messaging is desirable.

19 Claims, 11 Drawing Sheets

(56) References Cited

U.S. PATENT DOCUMENTS

2017/0105563 A1* 4/2017 Dawson ............ A47G 27/0293

OTHER PUBLICATIONS

Forbo Flooring Systems—Environmental Data Sheet (3 Pages) www.forbo-flooring.co.uk.
3M™ Nomad™ Modular Matting System—Primary Matting (indoor) (pp. 12-13).
Muovihaka—Entrance Mats (1 Page) http://muovikaka.com/en/entrancemats.
BKF System—Professional Entrance Mats Systems (36 Pages).
BKF System—Professional Entrance Mats—Comprehensive Solutions (2 Pages).
BKF System—Professional Entrance Mats Systems (4 Pages).

* cited by examiner

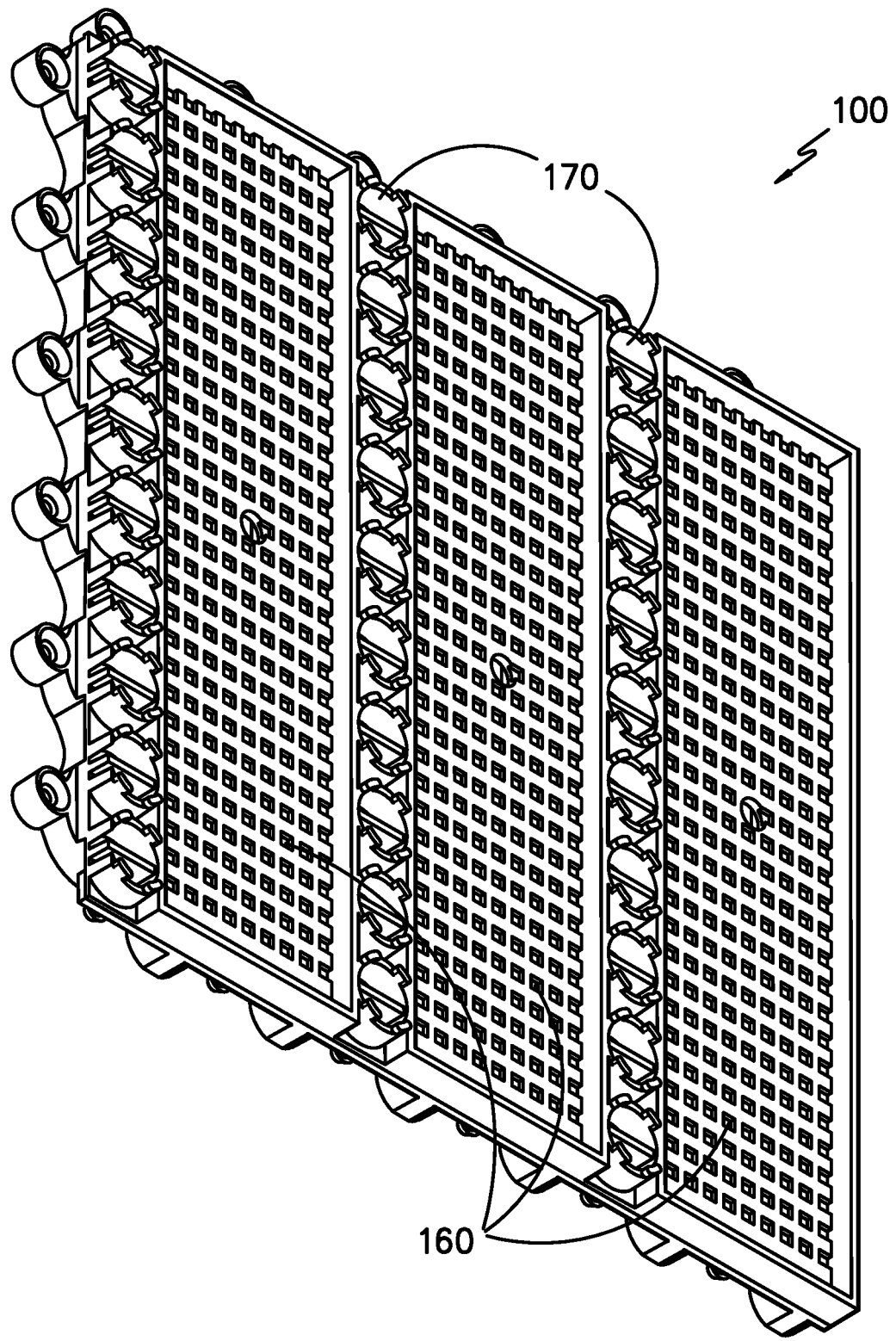
FIG. -1A-

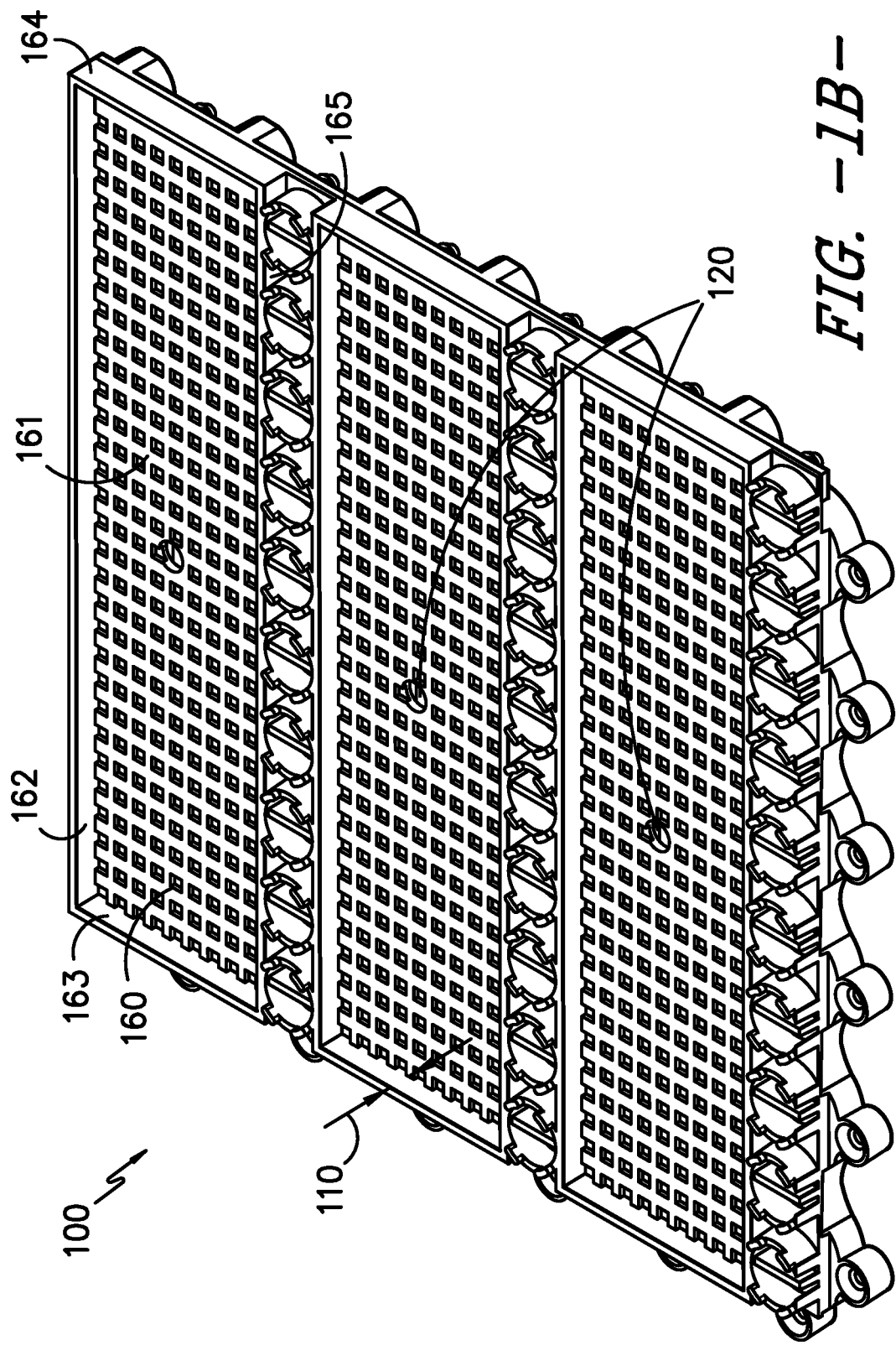
FIG. -1B-

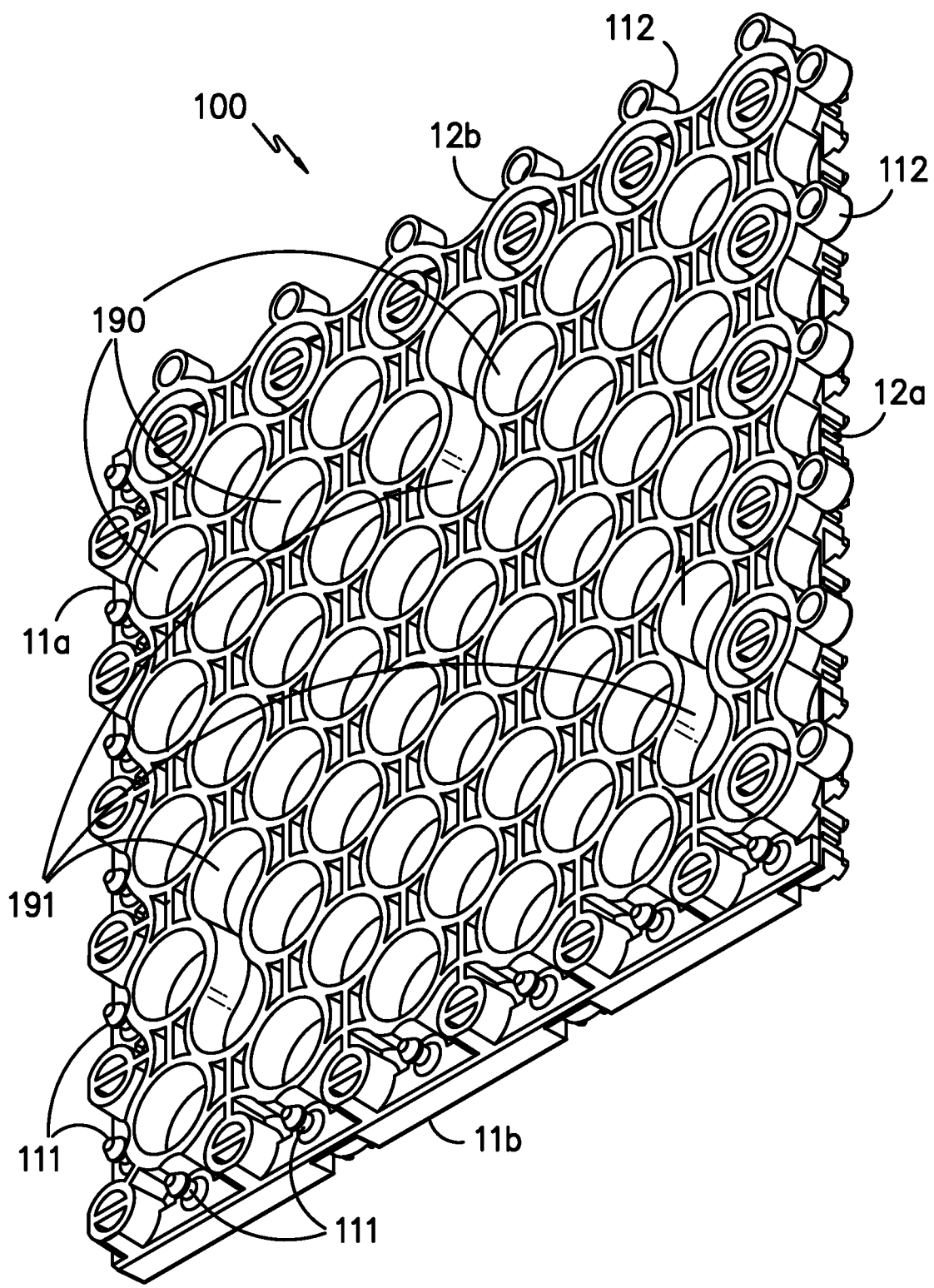
FIG. -1C-

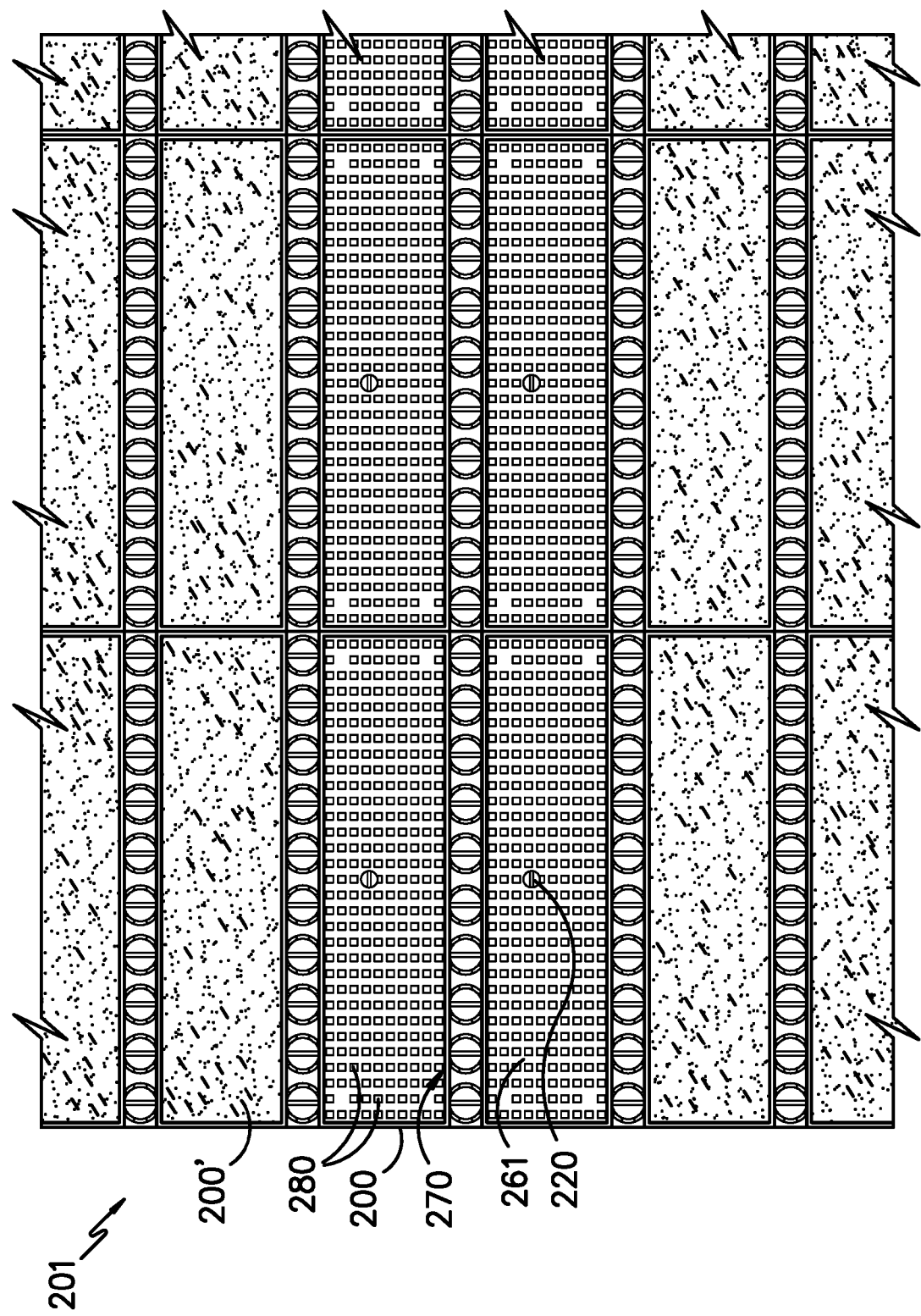
FIG. -2-

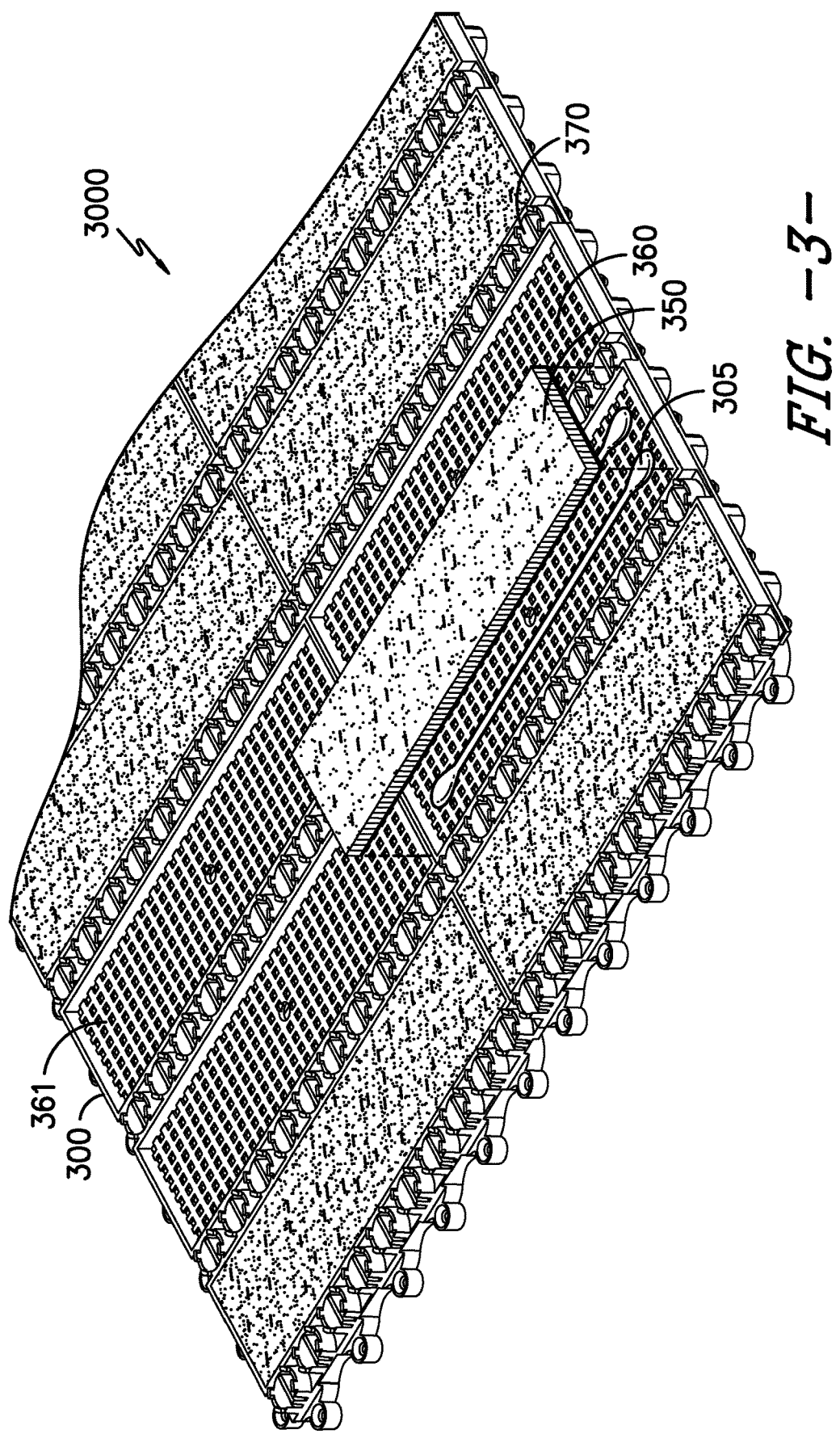
FIG. -3-

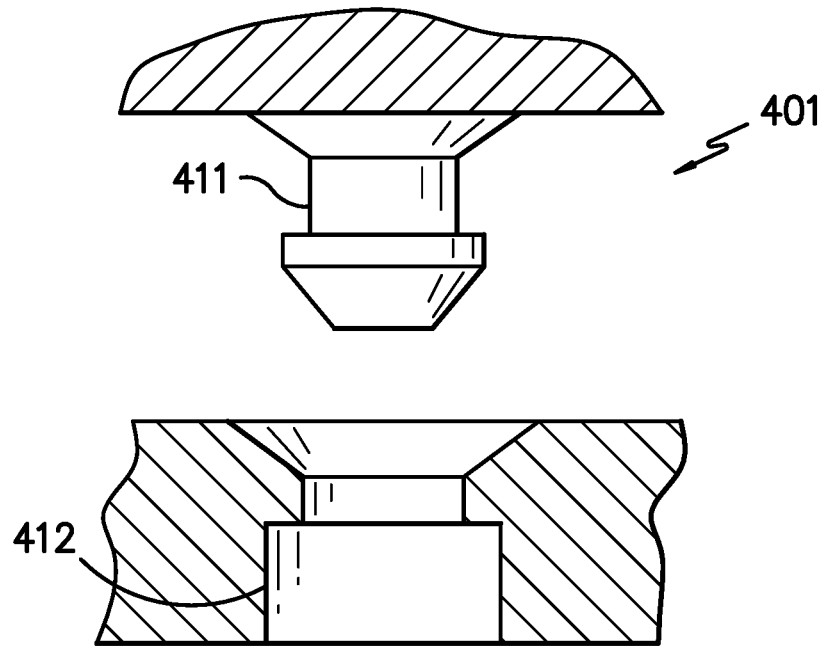
FIG. -4A-
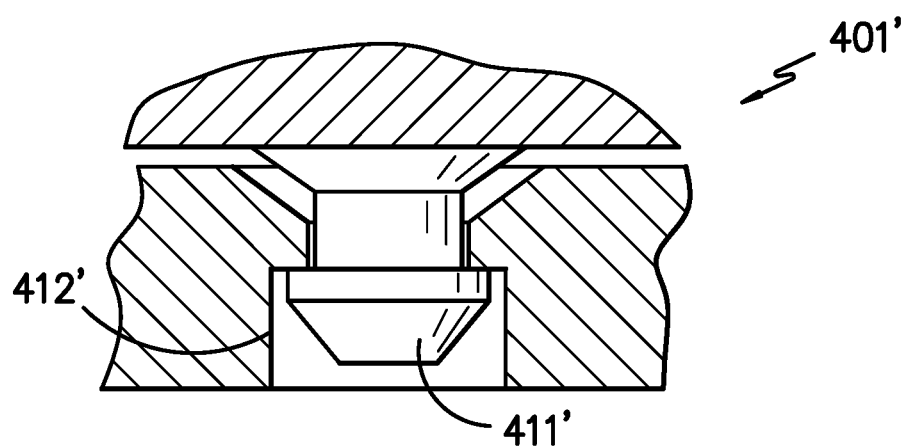
FIG. -4B-

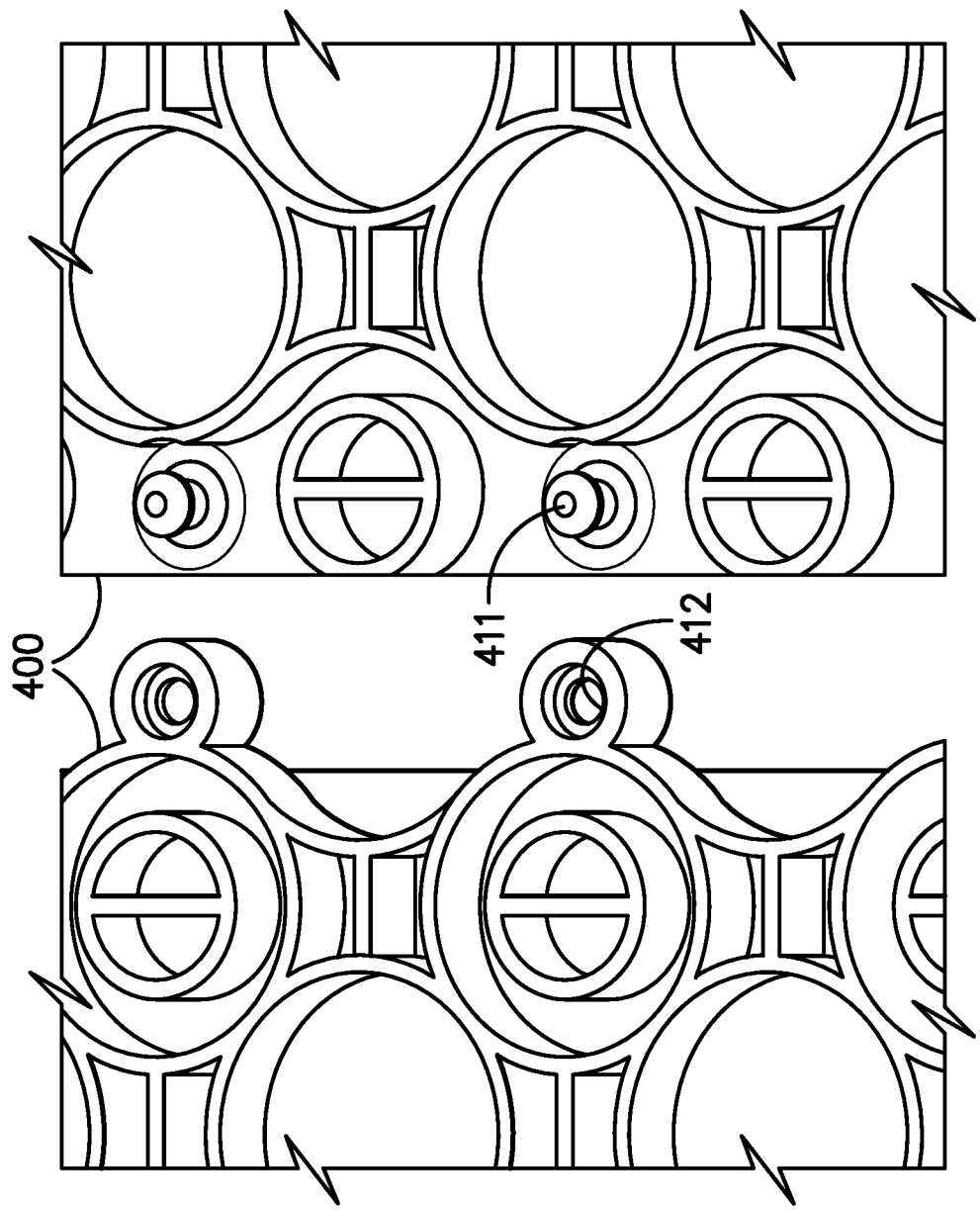
FIG. -4C-

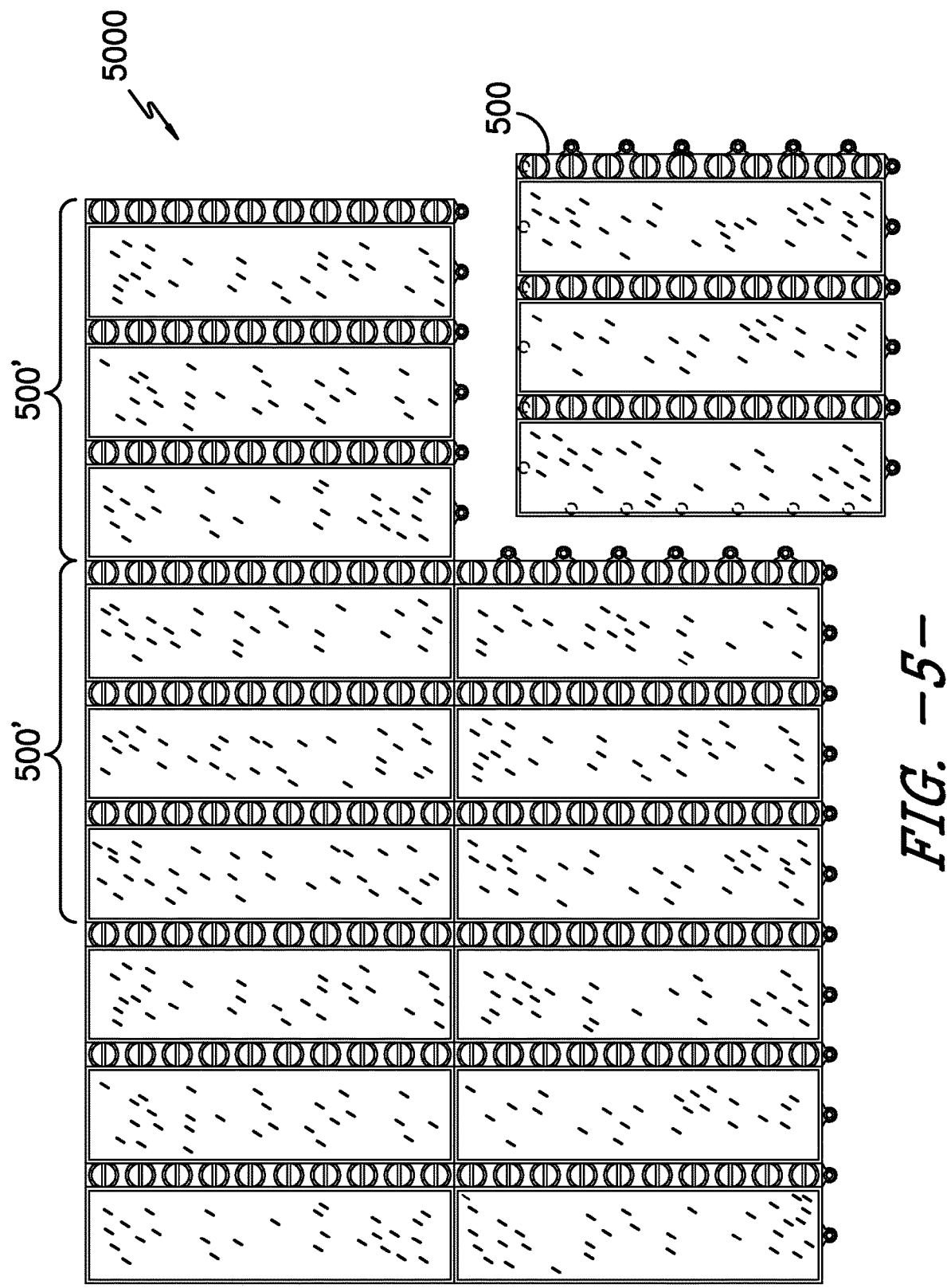
FIG. -5-

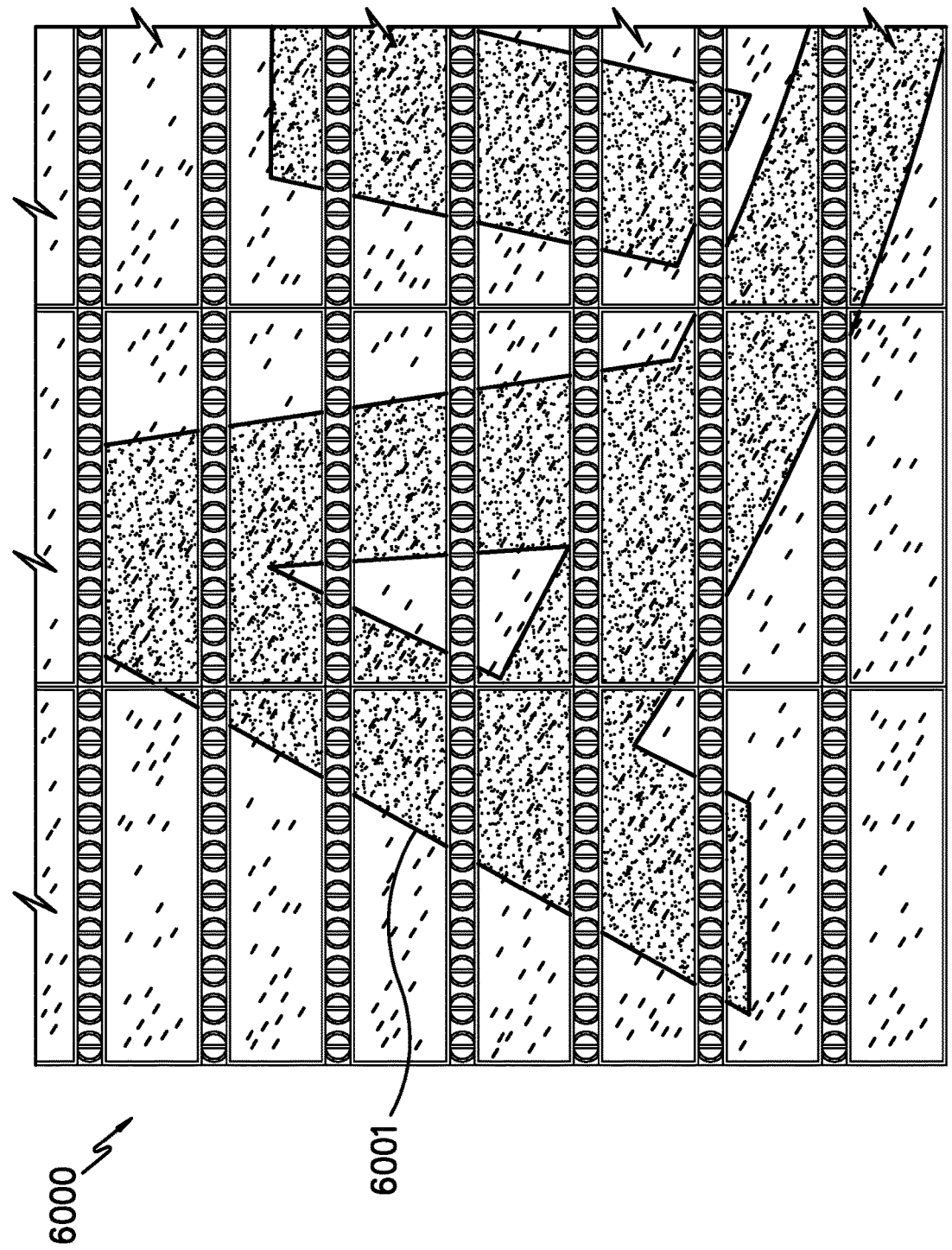
FIG. -6-

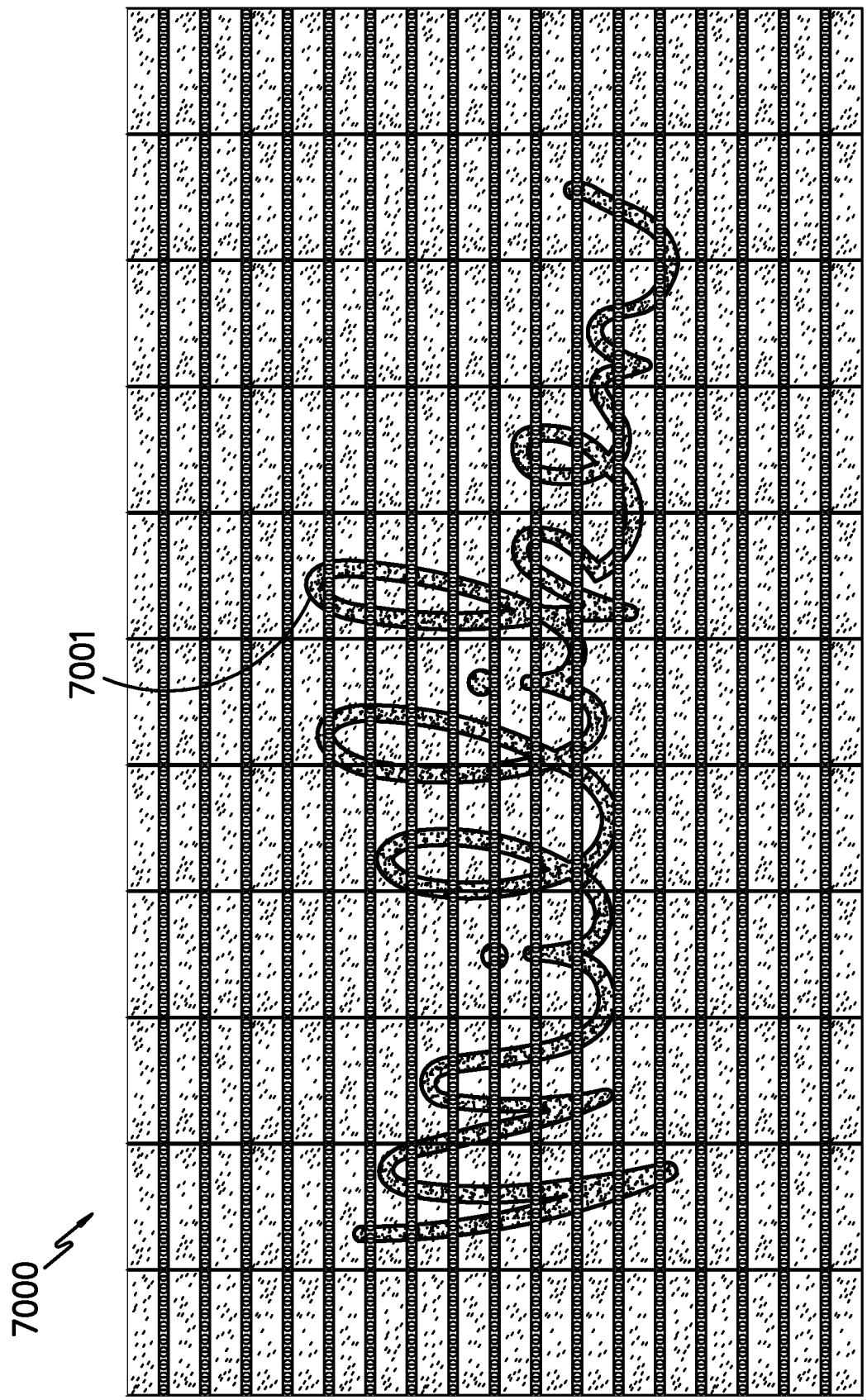
FIG. -7-

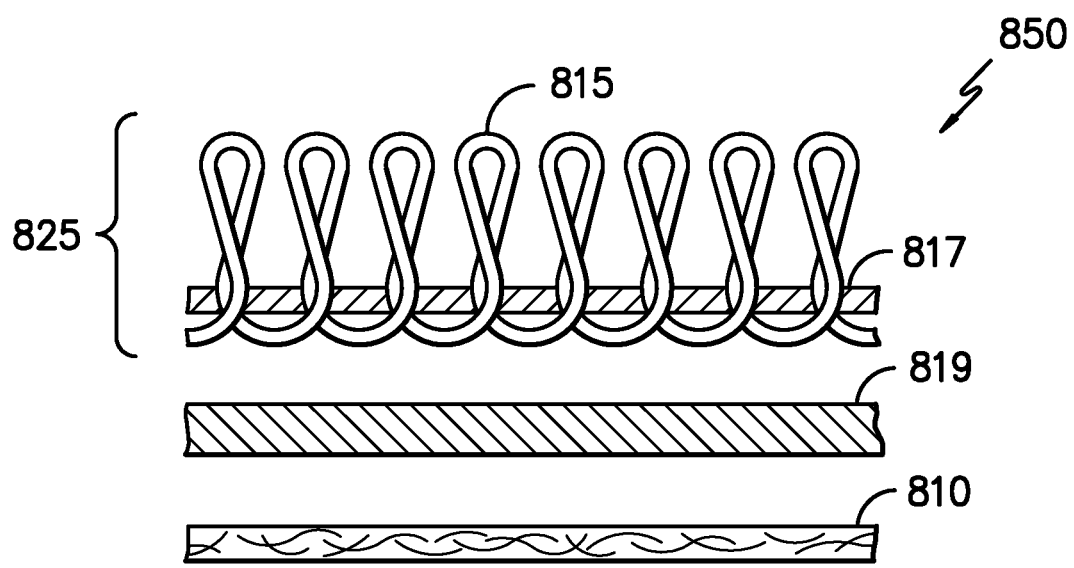
FIG. -8A-
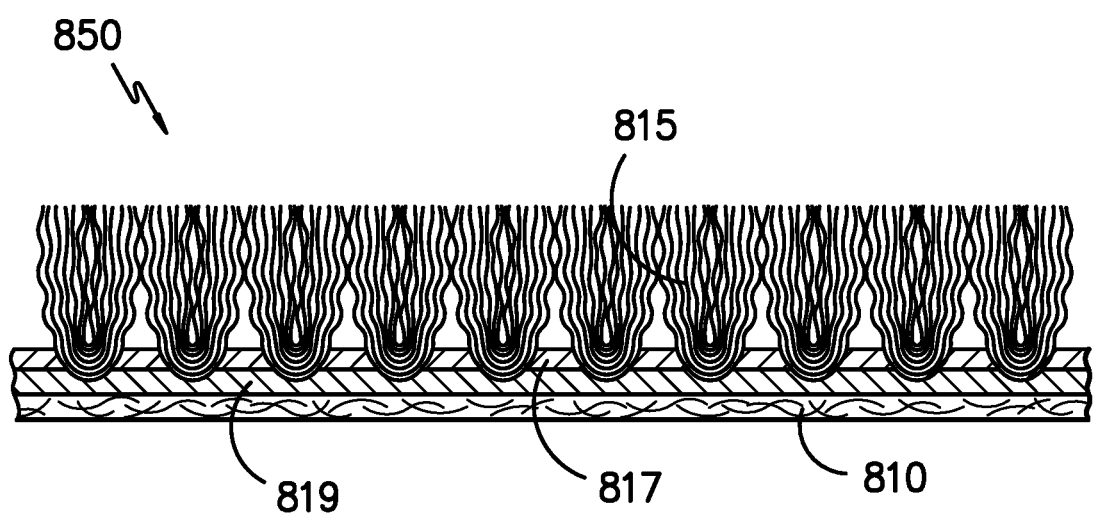
FIG. -8B-

MODULAR FLOOR MAT

CROSS REFERENCE TO RELATED APPLICATIONS

This application claims priority to U.S. Provisional Patent Application No. 62/576,128, entitled "Modular Floor Mat" which was filed on Oct. 24, 2017.

TECHNICAL FIELD

This invention relates to a modular floor mat comprising a plurality of interconnected thermoplastic trays with textile substrate inserts. The textile substrate inserts contain visual images, such as printed logos or advertisements. The modular floor mat is advantageous for use by businesses in entryways and other locations q where advertising or messaging is desirable.

BACKGROUND

The modular floor mat of the present invention is designed for high traffic areas, such as building entryways, where an advertising logo or other visual image may be displayed. The visual image may include an advertisement, information, a picture, a pattern, or a logo. The visual image is applied to a textile substrate, such as by printing. The visual image-containing textile substrate is then cut into smaller pieces. These smaller pieces correspond in size to individual thermoplastic trays. Each of the visual image-containing textile substrate pieces are inserted and attached to a thermoplastic tray. The thermoplastic trays containing the textile substrate inserts are then attached to one another via at least one attachment means to form the modular floor mat of the present invention.

BRIEF SUMMARY

In one aspect, the invention relates to a modular floor mat comprising: (a) a plurality of thermoplastic trays, wherein the plurality of thermoplastic trays each contain a bottom surface, four edge surfaces, and a recessed area; wherein the plurality of thermoplastic trays are connected to one another by at least one attachment means; (b) at least one textile substrate, wherein the at least one textile substrate is of the same approximate dimensions as the recessed area of the plurality of thermoplastic trays, and wherein the at least one textile substrate is permanently affixed to the plurality of thermoplastic trays; and (c) a visual image, wherein the visual image is present on at least a portion of the at least one textile substrate.

In another aspect, the invention relates to a method for advertising a business comprising the steps of providing a floor space, providing the modular floor mat of the present invention, installing the modular floor mat on the floor space; and allowing the modular floor mat to be viewed by passersby.

BRIEF DESCRIPTION OF THE DRAWINGS

FIG. 1A is a schematic drawing of one embodiment of a thermoplastic tray comprising the modular floor mat of the present invention.

FIG. 1B is a schematic drawing of one embodiment of a thermoplastic tray comprising the modular floor mat of the present invention showing additional features of the thermoplastic tray of FIG. 1A.

FIG. 1C is a schematic drawing of one embodiment of the floor-facing surface (bottom surface) of the thermoplastic tray shown in FIG. 1A.

FIG. 2 is a schematic drawing of one embodiment of a modular floor mat according to the present invention illustrating the interconnected arrangement of individual thermoplastic trays having textile substrates contained therein.

FIG. 3 is an angular top perspective view of one embodiment of the modular floor mat of the present invention showing the recessed area of the thermoplastic tray where the textile substrate insert is affixed.

FIG. 4A is a schematic drawing of one embodiment of an attachment means for connecting the thermoplastic trays to one another shown in an unattached state.

FIG. 4B is a schematic drawing of one embodiment of an attachment means for connecting the thermoplastic trays to one another shown in an attached state.

FIG. 4C is a schematic drawing of one embodiment of an attachment means for connecting the thermoplastic trays to one another shown in an unattached state and in relationship to the thermoplastic trays.

FIG. 5 is a schematic drawing of one embodiment of a modular floor mat in a partially assembled state as observed during installation.

FIG. 6 is a top perspective view of a portion of a modular floor mat of the present invention comprising a plurality of interconnected thermoplastic trays containing textile substrates having a visual image thereon.

FIG. 7 is a top perspective view of one embodiment of the modular floor mat of the present invention comprising a plurality of interconnected thermoplastic trays containing textile substrates having a visual image thereon.

FIG. 8A is an expanded side view of one embodiment of the textile substrate comprising the modular floor mat of the present invention.

FIG. 8B is an expanded side view of another embodiment of the textile substrate comprising the modular floor mat of the present invention.

DETAILED DESCRIPTION

The present invention described herein is a modular floor mat. The modular floor mat is comprised of interconnected thermoplastic trays which contain textile substrates. At least a portion of the textile substrates contains a visual image thereon.

The thermoplastic tray is made by an injection molding process. The thermoplastic tray is comprised of thermoplastic material. The term "thermoplastic" is used herein in its conventional sense to mean a resin having the property of softening or fusing when heated and of hardening again when cooled. Thermoplastic materials suitable for use herein are selected from the group consisting of polyolefin polymers (such as polyethylene, linear low density polyethylene, polypropylene, polybutylene and copolymers made from ethylene, propylene and/or butylene), polyvinyl chloride (including high density polyvinyl chloride), polyvinylidene chloride, cellulosic resins (such as cellulose acetate, cellulose acetate butyrate and cellulose acetate propionate), acrylic resins (such as polymethyl methacrylate, styrene acrylonitrile, polystyrene, polycarbonate and acrylonitrile-butadiene-styrene), polyamides (such as nylon 6 and nylon 66), polyesters (such as polyethylene terephthalate, glycol modified polyethylene terephthalate and polybutylene terephthalate), and the like, and combinations thereof.

FIG. 1A illustrates thermoplastic tray 100. Thermoplastic tray 100 contains recessed areas 160. Debris-collecting strip 170 is present in parallel and contiguous arrangement with recessed area 160. The debris-collecting strip 170 provides areas of the thermoplastic tray that are free from textile substrate. FIG. 1B also shows thermoplastic tray 100 having recessed area 160. Recessed area 160 includes a bottom surface 161 and four edge surfaces 162, 163, 164 and 165. Bottom surface 161 and edge surfaces 162, 163, 164, 165 form recessed area 160 within thermoplastic tray 100. FIG. 1B further illustrates that recessed area 160 of thermoplastic tray 100 possesses a certain amount of depth, thereby defining it as "recessed." The depth of recessed area 160 is illustrated by 110. Thermoplastic tray 100 also contains opening 120. Opening 120 is an area in bottom surface 161 that is free from thermoplastic material (i.e. it is a hole). Opening 120 may be of any size or shape and may be provided in any location of bottom surface 161. A plurality of openings may be provided as well.

The thermoplastic tray itself may be of any shape or size. The thermoplastic tray contains at least one recessed area for receiving a textile substrate. In this regard, the thermoplastic tray provides a recessed area for receiving a textile substrate and may be referred to as a textile substrate-receiving device. The textile substrate-receiving device is comprised of thermoplastic material. As shown by the Figures, the thermoplastic tray may be subdivided so that the tray contains two or more recessed areas. In one aspect, the tray is subdivided by extending thermoplastic material (e.g. in the form of a debris collection strip) from a first edge surface of the tray to a second edge surface of the tray that is opposite of the first edge surface. As a result, a thermoplastic tray is created that contains multiple recessed areas.

More specifically, and as shown in FIG. 1A, thermoplastic tray 100 contains three recessed areas 160 for receiving a textile substrate. Thus, each thermoplastic tray comprising the modular floor mat of the present invention may contain one recessed area for receiving one textile substrate, or it may contain a plurality of recessed areas for receiving a plurality of textile substrates. As used herein, "plurality" is intended to refer to more than one.

FIG. 1C illustrates one embodiment of the back surface of thermoplastic tray 100. The back surface of the thermoplastic tray is the surface which lies on the floor and therefore has direct contact with the surface of the floor. Various patterns and/or protrusions on the back surface of the thermoplastic tray may be present so as to facilitate the modular floor mat's adherence to the floor. The patterns and/or protrusions on the back surface of the thermoplastic tray may also contribute to the overall structural stiffness of the modular floor mat. By varying the shape (e.g. circle, hourglass, etc.), the size of the shape, and the thickness of the shapes, the stiffness and flexibility of the modular floor mat can be tailored. As illustrated in FIG. 1C, the back surface of tray 100 contains circles 190 and hourglass shapes 191 arranged in a pattern. The pattern may be a random, non-uniform pattern, or the pattern may be provided in a uniform arrangement. The pattern may contain two-dimensional and/or three-dimensional objects.

FIG. 1C further illustrates protrusions 111 and openings 112 which comprise the at least one attachment means of the modular floor mat. The at least one attachment means is provided for connecting the thermoplastic trays to one another. As shown in FIG. 10, protrusions 111 are provided in spaced interval along two edges of thermoplastic tray 100. Openings 112 are also provided in spaced interval along two edges of thermoplastic tray 100. Protrusions 111 and openings 112 are arranged so that a protrusion 111 from one tray aligns with an opening 112 from another thermoplastic tray. FIG. 10 also illustrates that protrusions 111 are present on side 11a and 11b of tray 100, while openings 112 are present on sides 12a and 12b of tray 100. Therefore, thermoplastic tray 100 comprises edges 11a and 11b with protrusions 111 and edges 12a and 12b with openings 112. Note that edges 12a and 12b do not contain any protrusions 111 (i.e. these edges are free from protrusions), and edges 11a and 11b do not contain any openings 112 (i.e. these edges are free from openings). While the thermoplastic tray is shown having openings on only two edges of the tray and protrusions on the opposite two edges of the tray, it is contemplated to be within the scope of the present invention that any arrangement of openings and protrusions that suitably attaches the trays to one another may be used. For instance, openings and protrusions may be provided in a one-to-one alternating arrangement (i.e. opening, protrusion, opening, protrusion, etc.) on one or more edges of the thermoplastic tray.

The thermoplastic tray, may be formed in a single molding process as a unitary article. Alternatively, portions of the tray may be molded separately and then bonded together in a second operation to form the tray. The portions comprising the thermoplastic tray may be made of the same thermoplastic material or different thermoplastic material. In one aspect, the thermoplastic tray may be formed according to the following procedure. Thermoplastic material is introduced into the injection moulding machine via a feed pipe and melted at the appropriate temperature on its way into the mould. The appropriate temperature is dependent upon the melt temperature of the specific thermoplastic material employed and can be determined by those skilled in the art. Typically, the mould is comprised of a stationary portion and a moving portion. The temperature of each portion is separately controlled (such as by electrical heating and/or water cooling). When the two portions of the mould are combined together, the thermoplastic material makes its way into the mould with the air evacuated to suit. Once the required cycle time is reached, that allows the thermoplastic material to cure/set, the moving portion of the mould separates from the stationary portion and ejection pins force the moulded piece out of the stationary portion. The resulting thermoplastic moulded piece (i.e. the thermoplastic tray) falls onto a collection belt which transfers the piece from the machine/mould.

FIG. 2 shows a top perspective view of a portion of modular floor mat 201 of the present invention containing a plurality of thermoplastic trays. A pattern of small squares 280 is observable on bottom surface 261 of thermoplastic tray 200. In one aspect of the invention, the pattern of small squares 280 is provided in order to increase the surface area for adhering the textile substrate to the thermoplastic tray and/or to provide a textured surface to the thermoplastic tray. While shown herein as square shapes, the pattern on bottom surface 261 may be any geometric shape that provides increased surface area for adherence and/or textured surface for the tray. Here again, opening 220 is seen in bottom surface 261. FIG. 2 illustrates textile substrate-containing thermoplastic trays 200' and thermoplastic trays 200 that do not yet contain textile substrates. Each thermoplastic tray shown in FIG. 2 (whether it contains a textile substrate or not) is bordered in parallel and contiguous arrangement by debris-collecting strip 270.

FIG. 3 is an angular top perspective view of a portion of modular floor mat 3000 of the present invention containing a plurality of thermoplastic trays. Adhesive composition 305 is present on bottom surface 361 of thermoplastic tray 300.

Textile substrate 350 is shown ready for placement and/or insertion into thermoplastic tray 300. Adhesive composition 305 will affix textile substrate 350 to thermoplastic tray 300. In this aspect of the invention, adhesive composition 305 may be present in a uniform or a non-uniform arrangement between textile substrate 350 and thermoplastic tray 300. Furthermore, adhesive composition 305 is in direct contact with at least a portion of textile substrate 350 and with at least a portion of thermoplastic tray 300. Textile substrate 350 is shown having substantially the same dimensions as recessed area 360 of thermoplastic tray 300. Debris-collecting strip 370 is shown bordering tray 300 in a parallel and contiguous arrangement.

The textile substrate is affixed to the thermoplastic tray by an adhesive composition. The adhesive composition may be a hot melt adhesive (such as a polyurethane or polyester hot melt adhesive), a pressure sensitive adhesive material (including one that allows for repositioning of the textile substrate), an adhesive material comprised of a rosin ester with an elastomer of water based or solvent based acrylic polymers, or an elastomeric material comprised of natural rubber or nitrile rubber or silicone rubber with a suitable tackifier, and the like, and combinations thereof. The adhesive composition may be used as the sole material securing the textile substrate to the thermoplastic tray, or it may be used in combination with additional mechanical or chemical means for securing the textile substrate to the thermoplastic tray.

In one aspect of the invention, the adhesive composition is a polyurethane hot melt adhesive applied to the thermoplastic tray using a semi-automatic XY gluing machine. After the adhesive composition has been applied to the tray, the textile substrate is manually inserted into the tray. Pressure is applied in order to ensure proper adherence between the tray and the substrate.

After each individual textile substrate is affixed to each individual thermoplastic tray, the textile substrate-containing thermoplastic trays are prepared for packaging. The textile substrate-containing thermoplastic trays are typically packaged in a specific order to make the job of assembling the modular floor mat easier for the installer. The installer will piece the modular floor mat together based on the artwork image provided in the packaging.

The thermoplastic trays are attached to one another to form a modular floor mat via at least one attachment means. The at least one attachment means is selected from magnetic attraction, mechanical attraction, cohesive attraction, and the like, and combinations thereof. More specifically, these include magnetic attraction (such as magnetic coatings, magnetic particles dispersed within a rubber or binder material, spot magnets, and the like), mechanical fasteners (such as Velcro® fastening systems, mushroom-shaped protrusions, grommets, rivets, pins, and the like), adhesive attraction (such as cohesive materials, silicone materials, and the like), and combinations thereof. Other mechanical fasteners useful for attaching the thermoplastic trays to one another include grommets, Velcro®, barbed pins, flared pins plastic rivets, spring loaded snaps, snaps that require special tools to release them to aid in the prevention of theft and inadvertent release, and the like, and combinations thereof. In one aspect of the invention, the at least one attachment means are releasably attachable to one another. In other words, the attachment can be released when the modular floor mat needs to be disassembled FIG. 4A illustrates one embodiment of a mechanical attachment means for connecting the thermoplastic trays with one another. Attachment means 401 is comprised of protrusion 411 and opening 412. FIG. 4A shows protrusion 411 and opening 412 of attachment means 401 in an unattached (e.g. not connected) state. FIG. 4B illustrates attachment means 401' comprised of protrusion 411' and opening 412'. FIG. 4B shows protrusion 411' and opening 412' of attachment means 401' in an attached (e.g. connected) state. The process of attaching the protrusion portion to the opening portion may be accomplished by aligning the protrusion portion with the opening portion and applying sufficient pressure to move the protrusion portion into the opening portion.

FIG. 4C illustrates thermoplastic tray 400 having protrusion 411 and opening 412 as integral parts of tray 400. In this embodiment of the invention, the attachment means is created during the injection molding process of the thermoplastic tray; and therefore, the attachment means is an integral part of the tray itself. Thus, in this aspect of the invention, the attachment means is comprised of the same thermoplastic material as the thermoplastic tray. However, in alternative embodiments of the invention, the at least one attachment means may be comprised of the same thermoplastic material of the thermoplastic tray or it may be comprised of a different thermoplastic material or even of non-thermoplastic material.

FIG. 5 illustrates modular floor mat 5000 in a state of partial assembly as would be observed during installation. Modular floor mat 5000 is comprised of a plurality of thermoplastic trays 500' which are interconnected to one another by at least one attachment means. Thermoplastic tray 500 is shown not yet connected to thermoplastic trays 500'. As the assembly and installation process continues, thermoplastic tray 500 will become interconnected with trays 500' via at least one attachment means and form part of modular floor mat 5000.

FIG. 6 illustrates a portion of a modular floor mat 6000 with visual image 6001. Visual image 6001 is a printed image that was applied to the surface of the textile substrate prior to cutting the textile substrate into smaller pieces for placement into thermoplastic trays. More specifically, the printed image was applied to the surface of a tufted pile carpet using a Chromojet® printing machine. The printed tufted pile carpet was then pressed onto a layer of 1.8 mm thick rubber material and a layer of 120 g/sqm weight polyester, non-woven substrate to form the printed textile substrate of the present invention. The printed textile substrate was then cut into smaller pieces using a Pathfinder cutting machine. These smaller pieces were cut into a size that corresponds to the recessed area of the thermoplastic trays. The pieces were then placed, without adhesive, directly into the thermoplastic trays to maintain the correct positioning of the modular floor mat. Next, the printed textile substrate-containing thermoplastic trays were moved to the adhesive machine (e.g. gluing machine), where operators adhered the printed textile substrates into the thermoplastic trays. Finally, the thermoplastic trays were boxed, taped, and labelled as part of the production process after the adhesive step. It should be noted that care was taken to organize and box the trays in a manner that allows the end-use customer of the modular floor mat to assemble the mat in the most efficient manner. Typically, a copy of the printed image is included with the modular floor so that the installer has a guide to follow for assembling the floor mat in the proper way.

FIG. 7 illustrates one embodiment of the modular floor mat of the present invention. Modular floor mat 7000 is shown with visual image 7001. Visual image 7001 is a printed image that was applied to the surface of the textile substrate prior to cutting the textile substrate into smaller pieces for placement into thermoplastic trays.

As shown in FIG. 8A, textile substrate 850 is comprised in part of tufted pile carpet 825. Tufted pile carpet 825 is comprised of primary backing layer 817 and face yarns 815. The primary backing layer 817 is typically included in the tufted pile carpet to give stability to the face yarns. The materials comprising face yarns 815 and primary backing layer 817 may independently be selected from synthetic fiber, natural fiber, man-made fiber using natural constituents, inorganic fiber, glass fiber, and a blend of any of the foregoing. By way of example only, synthetic fibers may include polyester, acrylic, polyamide, polyolefin, polyaramid, polyurethane, or blends thereof. More specifically, polyester may include polyethylene terephthalate, polytrimethylene terephthalate, polybutylene terephthalate, polylactic acid, or combinations thereof. Polyamide may include nylon 6, nylon 6,6, or combinations thereof. Polyolefin may include polypropylene, polyethylene, or combinations thereof. Polyaramid may include poly-p-phenyleneteraphthalamide (i.e., Kevlar®), poly-m-phenyleneteraphthalamide (i.e., Nomex®), or combinations thereof. Exemplary natural fibers include wool, cotton, linen, ramie, jute, flax, silk, hemp, or blends thereof. Exemplary man-made materials using natural constituents include regenerated cellulose (i.e., rayon), lyocell, or blends thereof.

The material comprising face yarns 815 and primary backing layer 817 may be formed from staple fiber, filament fiber, slit film fiber, or combinations thereof. The fiber may be exposed to one or more texturing processes. The fiber may then be spun or otherwise combined into yarns, for example, by ring spinning, open-end spinning, air jet spinning, vortex spinning, or combinations thereof. Accordingly, the material comprising face yarns 815 will generally be comprised of interlaced fibers, interlaced yarns, loops, or combinations thereof.

The material comprising face yarns 815 and primary backing layer 817 may be comprised of fibers or yarns of any size, including microdenier fibers or yarns (fibers or yarns having less than one denier per filament). The fibers or yarns may have deniers that range from less than about 0.1 denier per filament to about 2000 denier per filament or, more preferably, from less than about 1 denier per filament to about 500 denier per filament.

In one aspect of the invention, the textile substrate is comprised of a commercially available product from Milliken & Company (of Spartanburg, S.C.) known as the Foris™ textile substrate. The Foris™ textile substrate combines two types of high resilience polyamide fibers: monofilaments for the brushing action and multi-filaments for the absorption effect. These two fiber types are twisted together and heat set before the tufting process begins. The open tufting construction provides room for dirt storage, while allowing easy dirt release during maintenance. This particular textile substrate is manufactured with Econyl® fibers (commercially available from Aquafil S.p.A of Arco, Italy) which are comprised of 100% regenerated polyamide sourced from post-industrial and post-consumer waste, making modular floor mats comprising the Foris™ substrate a sustainable solution with commitment to respecting the environment.

Furthermore, the material comprising face yarns 815 and primary backing layer 817 may be partially or wholly comprised of multi-component or bi-component fibers or yarns in various configurations such as, for example, islands-in-the-sea, core and sheath, side-by-side, or pie configurations. Depending on the configuration of the bi-component or multi-component fibers or yarns, the fibers or yarns may be splittable along their length by chemical or mechanical action.

Additionally, face yarns 815 and primary backing layer 817 may include additives coextruded therein, may be precoated with any number of different materials, including those listed in greater detail below, and/or may be dyed or colored to provide other aesthetic features for the end user with any type of colorant, such as, for example, poly (oxyalkylenated) colorants, as well as pigments, dyes, tints, and the like. Other additives may also be present on and/or within the target fiber or yarn, including antistatic agents, brightening compounds, nucleating agents, antioxidants, UV stabilizers, fillers, permanent press finishes, softeners, lubricants, curing accelerators, and the like.

The face yarns 815 may be dyed or undyed. If the face yarns 815 are dyed, they may be solution dyed. The weight of the face yarn, pile height, and density will vary depending on the desired aesthetics and performance requirements of the modular floor mat. In FIG. 8A, face yarns 815 are illustrated in a loop pile construction. Looking to FIG. 8B, textile substrate 850 is shown with face yarns 815 in a cut pile construction. Of course, it is to be understood that face yarn constructions including combinations of loop pile and cut pile may likewise be used.

The primary backing layer 817 can be any suitable primary backing material. The primary backing layer 817 may be comprised of a woven, nonwoven or knitted material, or combinations thereof. The general purpose of primary backing layer 817 is to support the tufts of face yarns 815. In one aspect, primary backing layer 817 is a nonwoven polyester spunbond material. One commercially available example of the polyester spunbond material is Lutradur® from Freudenberg Nonwovens of Weinheim, Germany. In another aspect, flat woven polyester tapes, such as Isis™ from Propex of Chattanooga, Tenn., may be utilized. Also, Colback® nonwoven backing material may also be suitable for use. If needed, a primary backing layer made of a woven tape with either staple fibers or nonwoven fabrics affixed can be used. Also, stitch bonded and knitted polyester fabrics may be used.

The tufted pile carpet 825 that includes face yarns tufted into a primary backing layer may be heat stabilized to prevent dimensional changes from occurring in the finished mat. The heat stabilizing or heat setting process typically involves applying heat to the material that is above the glass transition temperature, but below the melting temperature of the components. The heat allows the polymer components to release internal tensions and allows improvement in the internal structural order of the polymer chains. The heat stabilizing process can be carried out under tension or in a relaxed state. The tufted pile carpet is sometimes also stabilized to allow for the yarn and primary backing to shrink prior to the mat manufacturing process.

In one aspect of the present invention, the tufted pile carpet is comprised of yarn tufted into fabric, which is then injection or fluid dyed, and then bonded with a rubber layer or washable latex backing. The carpet yarn may be selected from nylon 6; nylon 6,6; polyester; and polypropylene fiber. The yarn is tufted into a woven or nonwoven substrate. The yarn can be of any pile height and weight necessary to support printing so that a visual image can be applied to the textile substrate.

The visual image may be applied to the textile substrate using any known process for applying images to substrates. For example, the visual image may be applied to the textile substrate (e.g. a tufted pile carpet) via a printing process. By utilizing a printing process, a printed textile substrate is formed that contains at least one visual image. In one aspect, injection dyeing may be utilized to print the tufted pile carpet. Of course, it is to be understood that the textile substrate may contain one visual image or more than one visual image (i.e. a plurality of visual images).

The printing process utilizes printing inks containing at least one dye. Dyes may be selected from acid dyes, direct dyes, reactive dyes, cationic dyes, disperse dyes, and mixtures thereof. Acid dyes include azo, anthraquinone, triphenyl methane and xanthine types. Direct dyes include azo, stilbene, thiazole, dioxsazine and phthalocyanine types. Reactive dyes include azo, anthraquinone and phthalocyanine types. Cationic dyes include thiazole, methane, cyanine, quinolone, xanthene, azine, and triaryl methine. Disperse dyes include azo, anthraquinone, nitrodiphenylamine, naphthal imide, naphthoquinone imide and methane, triarylmethine and quinoline types.

As is known in the textile printing art, specific dye selection depends upon the type of fiber and/or fibers comprising the washable textile component that is being printed. For example, in general, a disperse dye may be used to print polyester fibers. Alternatively, for materials made from cationic dyeable polyester fiber, cationic dyes may be used.

The printing process of the present invention uses a jet dyeing machine, or a digital printing machine, to place printing ink on the surface of the mat in predetermined locations in order to form at least one visual image. One suitable and commercially available digital printing machine is the Millitron® digital printing machine, available from Milliken & Company of Spartanburg, S.C. The Millitron® machine uses an array of jets with continuous streams of dye liquor that can be deflected by a controlled air jet. The array of jets, or gun bars, is typically stationary. Another suitable and commercially available digital printing machine is the Chromojet® carpet printing machine, available from Zimmer Machinery Corporation of Spartanburg, S.C. In one aspect, a tufted carpet made according to the processes disclosed in U.S. Pat. Nos. 7,678,159 and 7,846,214, both to Weiner, may be printed with a jet dyeing apparatus as described and exemplified herein.

Viscosity modifiers may be included in the printing ink compositions. Suitable viscosity modifiers that may be utilized include known natural water-soluble polymers such as polysaccharides, such as starch substances derived from corn and wheat, gum arabic, locust bean gum, tragacanth gum, guar gum, guar flour, polygalactomannan gum, xanthan, alginates, and a tamarind seed; protein substances such as gelatin and casein; tannin substances; and lignin substances. Examples of the water-soluble polymer further include synthetic polymers such as known polyvinyl alcohol compounds and polyethylene oxide compounds. Mixtures of the aforementioned viscosity modifiers may also be used. The polymer viscosity is measured at elevated temperatures when the polymer is in the molten state. For example, viscosity may be measured in units of centipoise at elevated temperatures, using a Brookfield Thermosel unit from Brookfield Engineering Laboratories of Middleboro, Mass. Alternatively, polymer viscosity may be measured by using a parallel plate rheometer, such as made by Haake from Rheology Services of Victoria Australia.

As shown in FIGS. 8A and 8B, textile substrate 850 may also include a layer of vulcanized rubber 819. The rubber component may be selected from the group consisting of nitrile rubber [such as acrylonitrile-butadiene rubber (NBR)], styrene-butadiene rubber (SBR), natural rubber, chloroprene rubber, polychloroprene rubber, ethylene propylene rubber, ethylene propylene diene monomer (EPDM) rubber, fluoroelastomer rubber, polyurethane rubber, butyl rubber, halogenated butyl rubber [such as chlorobutyl rubber and bromobutyl rubber], isoprene rubber, epichlorohydrin rubber, polyacrylate rubber, chlorinated polyethylene rubber, hydrogenated NBR, carboxylated NBR, polybutadiene rubber, and the like, and mixtures thereof. The thickness of the vulcanized rubber layer will be such that the height of the finished textile substrate will be substantially the same height as, or only slightly higher than, the surrounding thermoplastic tray. Once vulcanized, the textile substrate may be pre-shrunk by washing.

Textile substrate 850 may further include a secondary backing layer 810. Secondary backing layer 810 may be a knit, nonwoven or woven fabric. Secondary backing layer 810 is independently selected of fibers and/or materials as described herein for face yarns 815 and primary backing layer 817. In one aspect of the invention, secondary backing layer 810 contains an abrasive surface which assists the textile substrate in adhering to the thermoplastic tray.

After the visual image has been applied to the textile substrate, the textile substrate (e.g. the printed textile substrate) will be custom cut to fit into the recessed area of the thermoplastic tray. The textile substrate may be cut using a computer controlled cutting device, such as a Gerber machine. It may also be cut using a mechanical dye cutter, hot knife, straight blade, or rotary blade. In one aspect of the invention, the thickness of the visual image-containing textile substrate will be substantially the same as, or slightly thicker than, the depth of the recessed area of the thermoplastic tray.

Modular floor mats of the present invention may be of any geometric shape or size as desired for its end-use application. The longitudinal edges of the floor mats may be of the same length and width, thus forming a square shape. Or, the longitudinal edges of the floor mats may have different dimensions such that the width and the length are not the same (such as in a rectangle). Alternatively, the floor mats may be circular, hexagonal, and the like. As one non-limiting example, modular floor mats of the present invention may be manufactured into any of the current industry standards sizes that include 2 feet by 4 feet, 3 feet by 4 feet, 3 feet by 5 feet, 4 feet by 6 feet, 3 feet by 10 feet, and the like.

The modular floor mat of the present invention may be exposed to post treatment steps. For example, chemical treatments such as stain release, stain block, antimicrobial resistance, bleach resistance, and the like, may be added to the textile substrate portion of the modular floor mat. Mechanical post treatments may include cutting, shearing, and/or napping the surface of the modular floor mat.

Several test methods for evaluating the performance of textile substrates (such as carpet and/or floor mats) are herein described.

The performance requirements for commercial matting include a mixture of well documented standards and industry known tests. Tuft Bind of Pile Yarn Floor Coverings (ASTM D1335) and the Aachen Dimensional Stability Test (ISO 2551) are performance tests referenced by several organizations (e.g. General Services Administration). Achieving tuft bind values greater than 4 pounds is desirable, and greater than 5 pounds even more desirable. With respect to the Aachen (ISO 2551) performance test, dimensional stability of less than +/−0.1% change may be most preferred.

Pilling and fuzzing resistance for loop pile (ITTS112) is a performance test known to the industry and those practiced in the art. The pilling and fuzzing resistance test is typically a predictor of how quickly the carpet (or textile substrate) will pill, fuzz and prematurely age over time. The test uses a small roller covered with the hook part of a hook and loop fastener. The hook material is Hook 88 from Velcro of Manchester, N.H. and the roller weight is 2 pounds. The hook-covered wheel is rolled back and forth on the tufted carpet face with no additional pressure. The carpet is graded against a scale of 1 to 5. A rating of 5 represents no change or new carpet appearance. A rating of less than 3 typically represents unacceptable wear performance.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

We claim:

1. A modular floor mat comprising:
   (a) a plurality of thermoplastic trays, wherein the plurality of thermoplastic trays each contain a bottom surface, four edge surfaces, and a recessed area; wherein the plurality of thermoplastic trays are connected to one another by at least one attachment means; wherein the at least one attachment means is selected from magnetic attraction, mechanical attraction, cohesive attraction, and combinations thereof;
   (b) at least one textile substrate, wherein the at least one textile substrate is approximately equal in size to the recessed area of the plurality of thermoplastic trays, and wherein the at least one textile substrate is permanently affixed to the plurality of thermoplastic trays via an adhesive composition; and
   (c) a visual image, wherein the visual image is present on at least a portion of the at least one textile substrate.

2. The modular floor mat of claim 1, wherein the plurality of thermoplastic trays are comprised of thermoplastic material selected from the group consisting of polyolefin polymers, polyvinyl chloride, polyvinylidene chloride, cellulosic resins, acrylic resins, polyamides, polyesters, and combinations thereof.

3. The modular floor mat of claim 2, wherein the thermoplastic material is polyvinyl chloride.

4. The modular floor mat of claim 3, wherein the thermoplastic material is high density polyvinyl chloride.

5. The modular floor mat of claim 1, wherein each of the thermoplastic trays are equal in size to one another.

6. The modular floor mat of claim 1, wherein the visual image is a printed image.

7. The modular floor mat of claim 1, wherein the visual image is an advertisement, an informational statement, a picture, a pattern, a logo, or combinations thereof.

8. The modular floor mat of claim 1, wherein the recessed area is bordered by the bottom surface and four edge surfaces of the plurality of thermoplastic trays.

9. The modular floor mat of claim 1, wherein the plurality of thermoplastic trays contains an opening in at least one of the bottom surface and four edge surfaces.

10. The modular floor mat of claim 1, wherein the at least one textile substrate further includes a vulcanized rubber layer.

11. The modular floor mat of claim 10, wherein the vulcanized rubber layer is selected from the group consisting of nitrile rubber, nitrile butadiene rubber (NBR), styrene butadiene rubber, natural rubber, chloroprene rubber, polychloroprene rubber, ethylene propylene rubber, ethylene propylene diene monomer rubber, fluoroelastomer rubber, polyurethane rubber, butyl rubber, halogenated butyl rubber, isoprene rubber, epichlorohydrin rubber, polyacrylate rubber, chlorinated polyethylene rubber, hydrogenated NBR, carboxylated NBR, polybutadiene rubber, and mixtures thereof.

12. The modular floor mat of claim 1, wherein the at least one textile substrate further includes a nonwoven fabric layer.

13. The modular floor mat of claim 1, wherein the at least one textile substrate is tufted pile carpet.

14. The modular floor mat of claim 1, wherein the visual image is present in an amount that comprises at least 50% of the total area of the modular floor mat.

15. The modular floor mat of claim 1, wherein the visual image is present in an amount that comprises at least 75% of the total area of the modular floor mat.

16. The modular floor mat of claim 1, wherein the visual image is present in an amount that comprises at least 90% of the total area of the modular floor mat.

17. The modular floor mat of claim 1, wherein the visual image contains areas of incongruity.

18. The modular floor mat of claim 1, wherein the visual image contains at least one area of incongruous lines.

19. A method for advertising a business comprising the steps of:
   (1) providing a floor space;
   (2) providing the modular floor mat of claim 1, (3) installing the modular floor mat on the floor space; and
(4) allowing the modular floor mat to be viewed by passersby.

* * * * *